(12) United States Patent
Schultz et al.

(10) Patent No.: US 8,447,162 B2
(45) Date of Patent: May 21, 2013

(54) SAVING AND RESTORING CONTROL SETTINGS FOR MULTIMEDIA CONTENT RECEIVERS

(75) Inventors: Mark Alan Schultz, Carmel, IN (US); Ronald Douglas Johnson, Westfield, IN (US)

(73) Assignee: Thomson Licensing, Boulogne-Billcourt (FR)

( * ) Notice: Subject to any disclaimer, the term of this patent is extended or adjusted under 35 U.S.C. 154(b) by 143 days.

(21) Appl. No.: 12/735,909

(22) PCT Filed: Dec. 4, 2008

(86) PCT No.: PCT/US2008/013323
§ 371 (c)(1),
(2), (4) Date: Aug. 24, 2010

(87) PCT Pub. No.: WO2009/116975
PCT Pub. Date: Sep. 24, 2009

(65) Prior Publication Data
US 2010/0322588 A1 Dec. 23, 2010

Related U.S. Application Data

(60) Provisional application No. 61/070,074, filed on Mar. 20, 2008.

(51) Int. Cl.
*H04N 5/765* (2006.01)

(52) U.S. Cl.
USPC .......................................... 386/234; 385/200

(58) Field of Classification Search
USPC .................. 386/200, 231, 234, 248, 291, 299
See application file for complete search history.

(56) References Cited

U.S. PATENT DOCUMENTS

| | | | |
|---|---|---|---|
| 5,596,647 A | 1/1997 | Wakai |
| 5,854,591 A | 12/1998 | Atkinson |
| 5,896,129 A | 4/1999 | Murphy |
| 6,014,381 A | 1/2000 | Troxel |
| 6,058,288 A | 5/2000 | Reed |
| 6,249,913 B1 | 6/2001 | Galipeau |
| 6,377,188 B1 | 4/2002 | Maruyama |
| 6,393,343 B1 | 5/2002 | Frey |
| 6,559,812 B1 | 5/2003 | McCarten |
| 6,762,733 B2 | 7/2004 | Smith |
| 7,114,171 B2 | 9/2006 | Brady |
| 7,130,724 B2 | 10/2006 | Petersen |

(Continued)

FOREIGN PATENT DOCUMENTS

| | | |
|---|---|---|
| CN | 1909696 | 2/2007 |
| EP | 0907281 | 4/1999 |

(Continued)

OTHER PUBLICATIONS

European Search Report dated Feb. 19, 2010.

*Primary Examiner* — Robert Chevalier
(74) *Attorney, Agent, or Firm* — Robert D. Shedd

(57) ABSTRACT

A settings controller for a multimedia content receiver is responsive to a control settings command. The settings controller saves a first set of control settings and loads a second set of control settings associated with the control settings command after saving the first set of control settings. It then reloads the first set of control settings when the control settings command is no longer valid. This allows for viewer settings to be automatically restored after an interruption.

11 Claims, 6 Drawing Sheets

U.S. PATENT DOCUMENTS

2007/0021099 A1 1/2007 Sato
2009/0227224 A1* 9/2009 Aftelak et al. ............ 455/404.2

FOREIGN PATENT DOCUMENTS

| | | |
|---|---|---|
| EP | 1746854 | 1/2007 |
| JP | 578043 | 10/1993 |
| JP | 200423591 | 1/2004 |
| JP | 2004248138 | 9/2004 |
| JP | 2005318049 | 11/2005 |
| JP | 2006109301 | 4/2006 |
| JP | 20075738 | 3/2007 |

* cited by examiner

SAVING AND RESTORING CONTROL SETTINGS FOR MULTIMEDIA CONTENT RECEIVERS

RELATED APPLICATIONS

This application claims the benefit, under 35 U.S.C. §365 of International Application PCT/US2008/013323 and filed Dec. 4, 2008, which was published in accordance with PCT Article 21 (2) on Sep. 24, 2009, in English and which claims the benefit of U.S. provisional patent application No. 61/070,074, filed on Mar. 20, 2008, in English.

BACKGROUND

Normally, multimedia content receivers such as set top boxes (STBs) have simple controls for changing viewer settings. In a home viewing situation, the user typically controls 100% of the control settings. However, in public transportation systems such as, for example, airlines, this is not always the case. In this instance, the viewing settings are normally reset during the start of the flight and then are under the passenger's control for many items such as volume, brightness, off/on enabling of the monitor, and the channel selects. The only parameter that is usually controlled during an announcement is the channel select which switches the video and audio inputs to auxiliary inputs. As the technology gets more sophisticated, it might be desired to uniquely deliver special instructions to each seat for individual safety messages or video. Simply switching to and from auxiliary inputs for PA announcements will have limited use in this scenario. Thus, the current techniques are simple and easy to implement but lack the features that help protect the passenger and the airline to their fullest extent.

SUMMARY

Configuration settings for multimedia content control such as, for example, audio, video, power, captioning, language selection, and/or menus and the like can be automatically reconfigured during, for example, interruptions such as PA announcements and then restored to a viewer's original settings after the interruption is over. The configuration settings can also be optimized based on the type of interruption such as for announcements and/or emergencies and the like to increase viewer safety and communication which can be very different than the normal settings that a viewer may select for normal content viewing.

In one aspect of the present principles, a settings controller for a multimedia content receiver is responsive to a control settings command. The settings controller saves a first set of control settings and loads a second set of control settings associated with the control settings command after saving the first set of control settings when a control settings command is received. It then reloads the first set of control settings when the control settings command is no longer valid.

According to another aspect, a method is provided comprising the steps of receiving a control settings command, saving a first set of control settings of a content controller device for a multimedia content receiver in response to the control settings command, loading a second set of control settings associated with the control settings command into the content controller device after saving the first set of control settings, and reloading the first set of control settings into the content controller device when the control settings command is no longer valid.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter can be employed, and the subject matter is intended to include all such aspects and their equivalents. Other advantages and novel features of the subject matter can become apparent from the following detailed description when considered in conjunction with the drawings.

DETAILED DESCRIPTION

Figure 1:
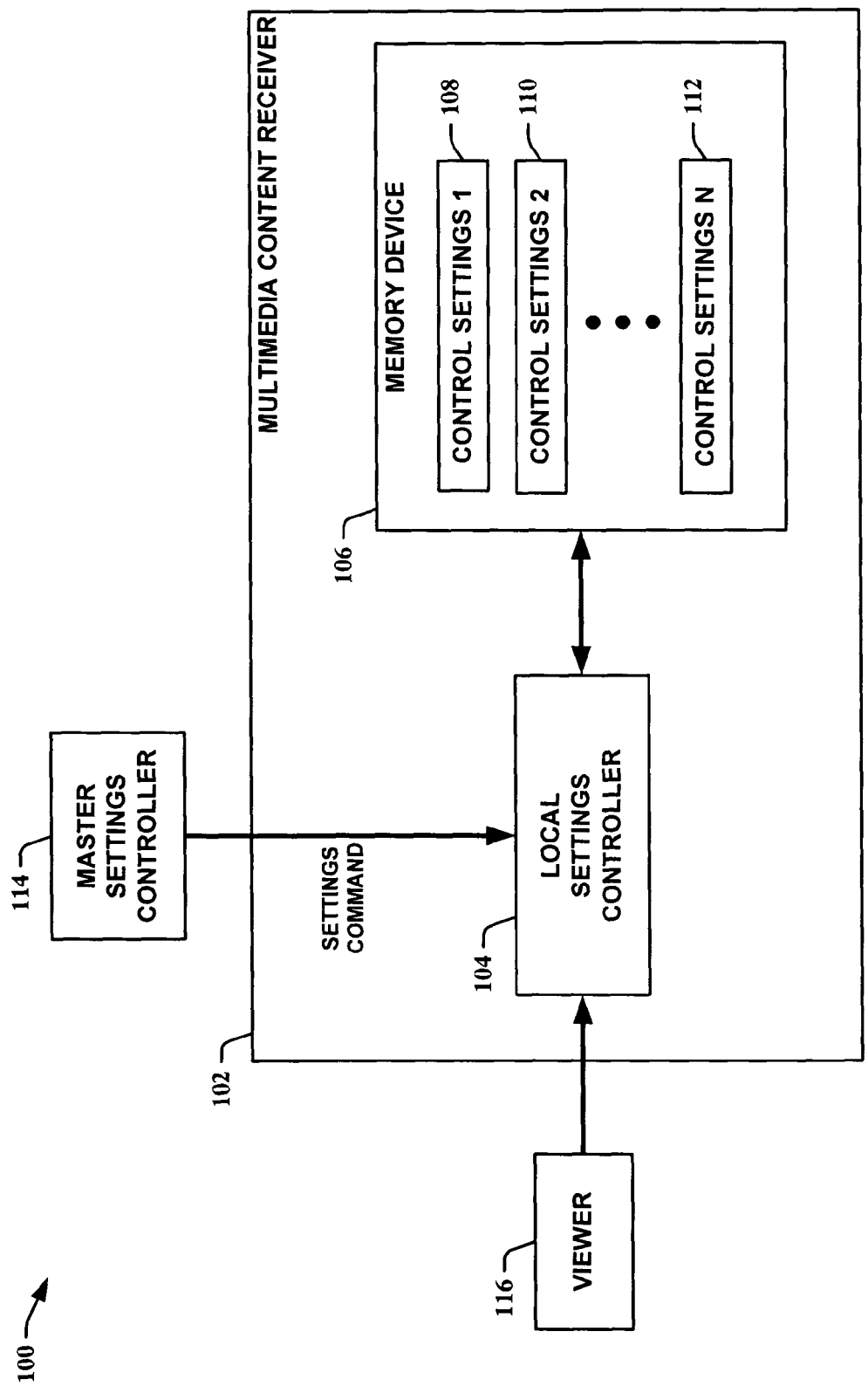
FIG. 1 is a block diagram of a settings controller for a multimedia content receiver in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details. In other instances, well-known structures and devices are shown in block diagram form in order to facilitate describing the embodiments.

As used in this application, the term "component" is intended to refer to hardware, software, or a combination of hardware and software in execution. For example, a component can be, but is not limited to being, a process running on a processor, a processor, an object, an executable, and/or a microchip and the like. By way of illustration, both an application running on a processor and the processor can be a component. One or more components can reside within a process and a component can be localized on one system and/or distributed between two or more systems. Functions of the various components shown in the figures can be provided through the use of dedicated hardware as well as hardware capable of executing software in association with appropriate software.

When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting instances and embodiments of the invention are intended to encompass both structural and functional equivalents. Additionally, it is intended that such equivalents include both currently known equivalents as well as equivalents developed in the future (i.e., any elements developed that perform the same function, regardless of structure).

Systems and methods are presented that allow a viewer's control settings of multimedia content to be saved and restored after an interruption has occurred. The interruptions can include, but is not limited to, pausing or stopping a multimedia content receiver while content is being viewed. This typically occurs in environments where announcements are made while users are viewing content such as, for example, in airplanes, buses, and other mass transit systems and the like. However, the aspects are not limited to this type of environment and can also work within home environments and the like.

FIG. 1 is a block diagram 100 of a local settings controller 104 for a multimedia content receiver 102. The local settings controller 104 interfaces with a memory device 106 to store and retrieve control settings 1 through N (108 through 112). The memory device 106 can be, but is not limited to, volatile memory, non-volatile memory, hard drive, optical and/or solid state memory and the like. The local settings control 104 is responsive to a settings command. When a settings command is received, the controller 104 stores a first set of control settings 108 and retrieves a second set of control settings 110. When the settings command is no longer valid, the controller 104 reloads the first set of control settings 108. For example, the first set of control settings 108 can represent a viewer's settings for a movie. The second set of control settings 110 can represent emergency settings for a weather alert. The emergency settings could include louder volume, flashing video and/or other indicators that draw a viewer's attention. The number and type of sets of control settings is not limited. The controller 104 can also select to load portions of one or more sets of control settings 108 through 112. This allows the controller 104 to retain flexibility in keeping particular settings consistent despite receiving a settings command. For example, if a viewer has selected a language change for displayed text, that language can be retained whether watching a movie or displaying emergency notifications and the like.

The controller 104 can accept a settings command from a master settings controller 114, but it is not limited by the source of the actual command (e.g., a viewer and/or other source could issue a settings command). The settings command can be, for example, an analog and/or digital signal or message and the like. It can be a continuous signal (e.g., a line held high) and/or a discrete signal (e.g., momentarily held high) and the like. The controller 104 can also be programmed to load sets of control settings for a set period of time after a settings command is received without requiring a direct indication to reset the settings commands to their original state. In one aspect, keying a Public Announcement (PA) microphone can be interpreted as a settings command (e.g., the microphone key signal indicates that an interruption of normal viewing is occurring and a viewer's settings can be changed based on that signal). One skilled in the art can appreciate that the settings command can originate from any source and be transmitted by any means (e.g., wireless, wired, digital, analog, etc.). Even a viewer 116 can originate a settings command. This would allow additional flexibility for multimedia content distribution system installations.

The local settings controller 104 can also accept viewer 116 interactions during an interruption (e.g., when a settings command is valid). For example, the loaded control settings might be in English and a viewer might require Spanish. The viewer can then change the text and/or audio language while the settings command is valid. Other controls, however, can be locked out (e.g., the loudness level of the audio, etc.). This type of change can be retained by the local settings controller 104 even when the original control settings are reloaded (e.g., the settings command becomes invalid).

Figure 2:
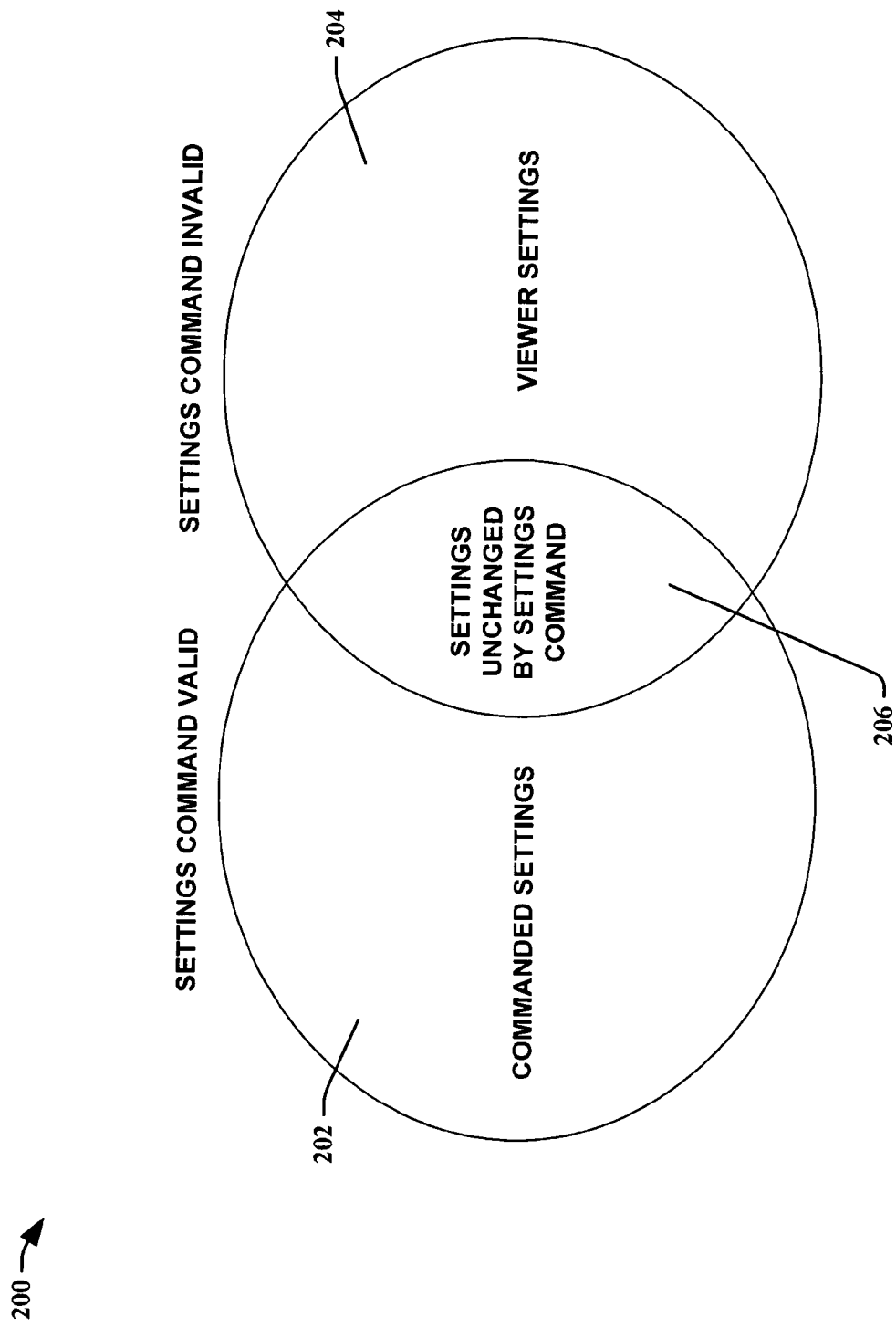
FIG. 2 is a Venn diagram of how control settings are affected in accordance with an aspect of an embodiment.

FIG. 2 is a Venn diagram 200 of how control settings are affected in a multimedia content receiver. Circle 202 includes commanded settings that are loaded when a settings command is valid. Circle 204 includes viewer settings that are loaded when a settings command is invalid. The overlap 206 demonstrates that some control settings can remain unchanged regardless of the state of the settings command. Thus, the controller 104 can accomplish this by retaining certain settings while saving and retrieving sets of control settings. For example, if language has been changed by a viewer after a settings command is valid, the controller 104 can reload the first set of control settings 108 except for the language setting (retaining the change made during the settings command) when the settings command goes invalid. Likewise, the language setting can be retained before, during and after an interruption. The controller 104 can also selectively save and/or load portions of multiple sets of control settings based on a particular type of settings command (e.g., emergency command versus public service announcement command, etc.).

Figure 3:
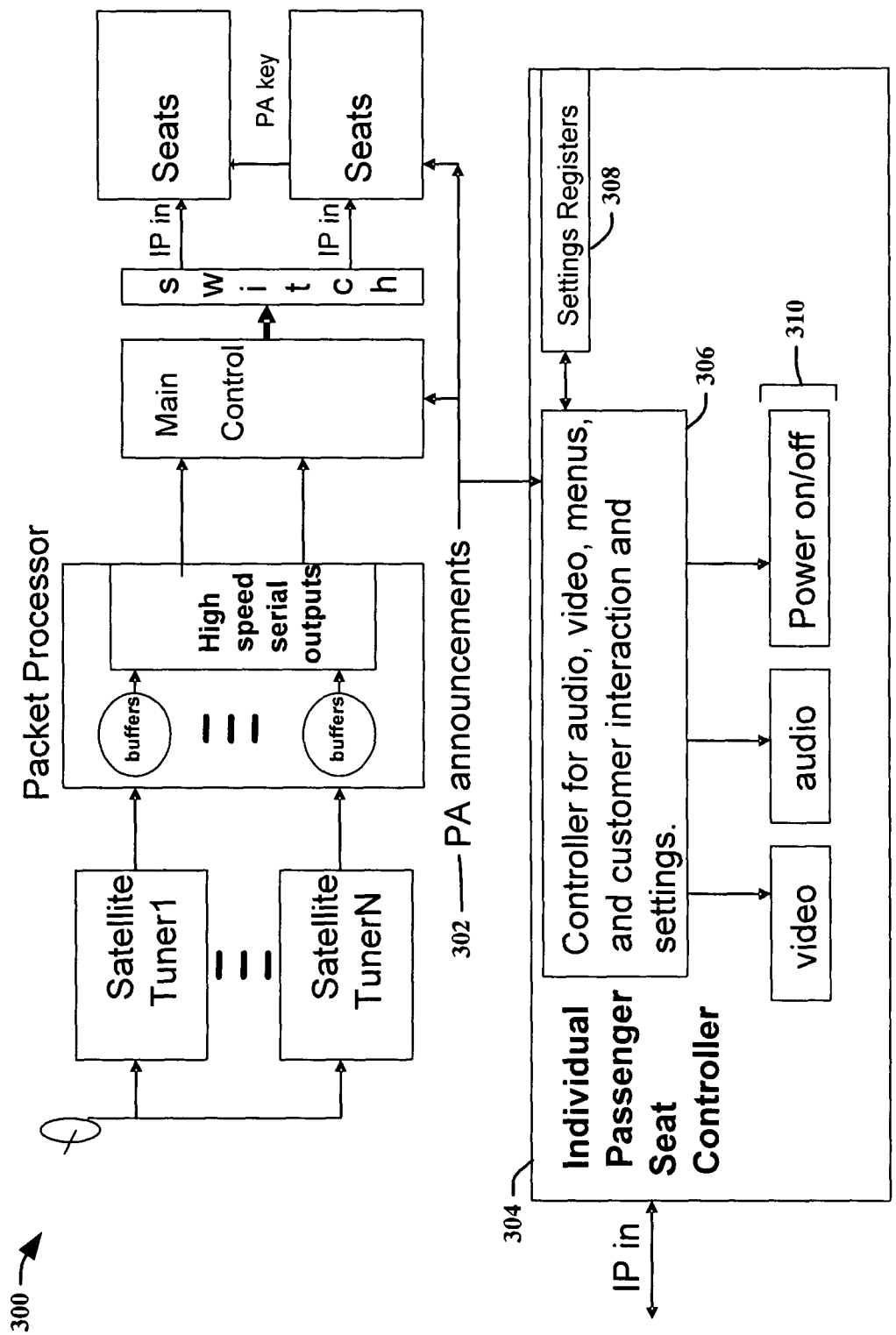
FIG. 3 is an example of managing a control set in an airborne environment in accordance with an aspect of an embodiment.
Figure 4:
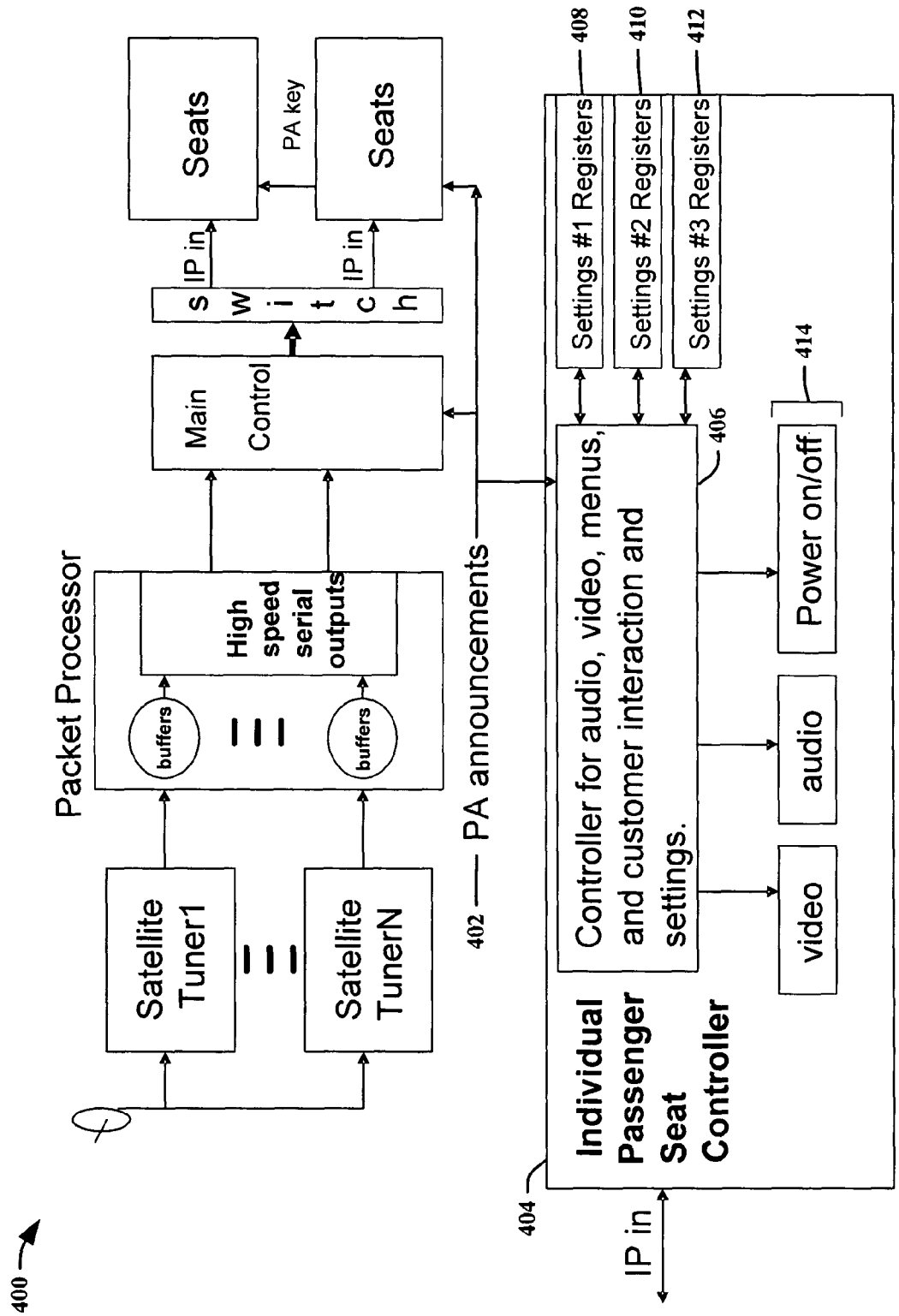
FIG. 4 is an example of managing a multiple control sets in an airborne environment in accordance with an aspect of an embodiment.

FIG. 3 depicts an exemplary embodiment of a system 300 for managing a control set in an airborne environment. The system 300 includes a master settings controller (in this example, a PA announcement) 302 that can send settings commands to any number of passenger set bottom boxes 304 (e.g., an airplane equivalent of a set top box (STB)). A local settings controller 306 interacts with settings register 308 to store and retrieve a passenger's control settings for viewing multimedia content. In this example, the local settings controller 306 controls the settings (310) for video, audio and power ON/OFF. FIG. 4 extends this example by providing an example 400 of managing multiple control sets in an airborne environment. Additional registers 408 through 412 are added to the local settings controller 404 so that when a control command 402 is received (e.g., when a PA announcement occurs), a different register setting can be loaded. In one case, Settings #1 408 could be the normal user settings, Settings #2 410 could be the PA settings, and Settings #3 412 could be a combination of user settings that could also be used in the PA settings such as language selection.

Figure 5:
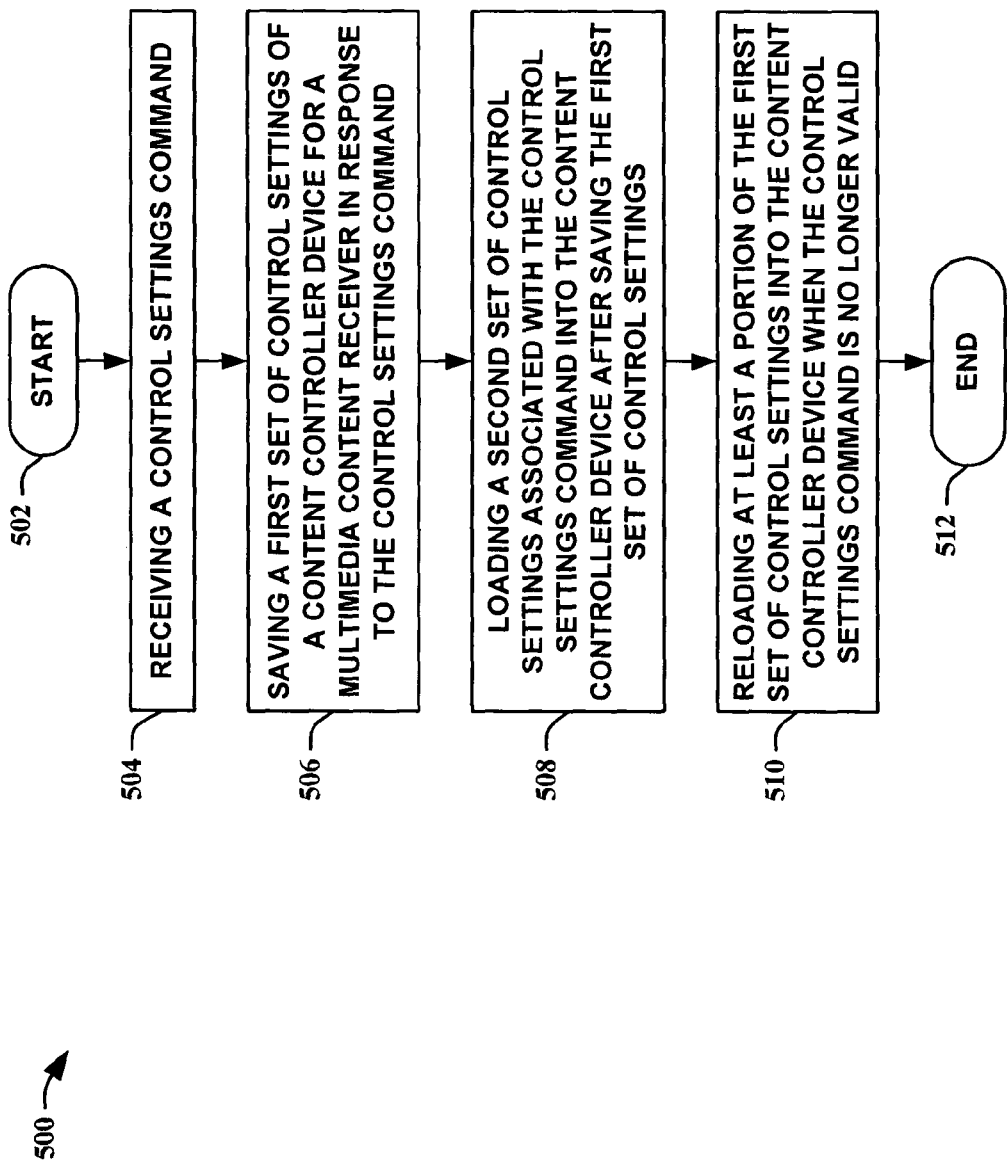
FIG. 5 is a flow diagram of a method of automatically switching between control sets in accordance with an aspect of an embodiment.
Figure 6:
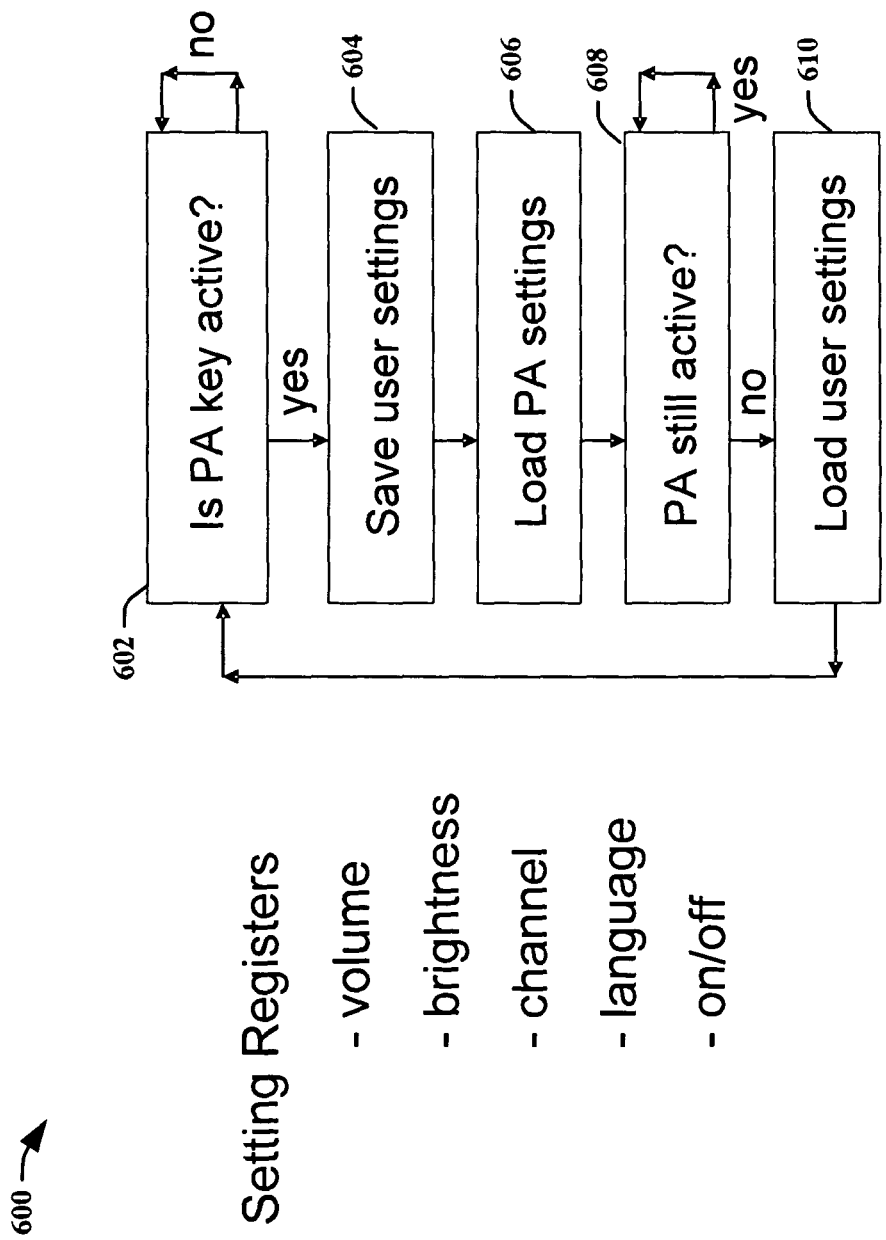
FIG. 6 is an example method of automatically switching between control sets for a public announcement in accordance with an aspect of an embodiment.

In view of the exemplary systems shown and described above, methodologies that can be implemented in accordance with the embodiments will be better appreciated with reference to the flow charts of FIGS. 5-6. While, for purposes of simplicity of explanation, the methodologies are shown and described as a series of blocks, it is to be understood and appreciated that the embodiments are not limited by the order of the blocks, as some blocks can, in accordance with an embodiment, occur in different orders and/or concurrently with other blocks from that shown and described herein.

Moreover, not all illustrated blocks may be required to implement the methodologies in accordance with the embodiments.

FIG. 5 is a flow diagram of a method 500 of automatically switching between control sets. The method starts 502 by receiving a control settings command 504. As described above the command can be received from any entity, and the command itself can be discrete, continuous, analog, digital and/or other form of signal (including wired, wireless, etc. forms of communication). The receipt of the command triggers the saving of a first set of control settings of a content controller device for a multimedia content receiver 506. The multimedia content receiver can be a set top box, a set bottom box, and/or any other type of receiver of multimedia content. Thus, the multimedia receiver can be located in homes, apartments, airplanes, buses and/or any other private or public venues. A second set of control settings associated with the control settings command is then loaded into the content controller device 508. The second set can be representative of emergency and/or public announcement settings and the like and/or a combination of various control settings. When the control settings command is no longer valid, at least a portion of the first set of control settings can be reloaded into the content controller device 510, ending the flow 512. Certain settings can be retained and, thus, it might not be desirable to reload the entire first set of control settings (e.g., a viewer changed the language while the control settings command was valid and the language change cant then be retained when the control settings command goes invalid).

FIG. 6 is an example method 600 of automatically switching between control sets for a public announcement. On an airplane, passengers normally control if the video monitor is ON, the volume, the brightness, the channel, and language of the content. These setting might not be optimized for PA safety announcements, the video content that shows how to fill out the immigration papers, and/or other pilot controlled operations and the like. The controller for each passenger's set bottom box stores and controls the audio, video, programs selection, language selection, and all other settings in the passenger's environment. This example shows how to have two complete set of settings: one for passenger settings for movie and/or other content viewing, and one for PA announcement and safety settings. These two controls do not have to be unique where if the passenger selects a language other than the default language for movies, the same settings can be applied to the PA announcements when the selected language is available. If it is not available, the default language applies. The language selection can help select the appropriate packet identifiers (PIDs) for language if a broadcaster supports multiple voice channels encoded on different PIDs. The language selection can also affect the selection of the closed caption stream if two languages are supported.

The main switching between the settings occurs when the PA announcement key is activated by flight attendants or pilots 602. The signal starts off a series of controls that saves all of the present settings for each passenger's controls 604 and then loads a second predetermined set of settings for each passenger that the airline controls 606. Exceptions to this could be some common settings that would be of safety interest to the passenger such as language selection. Some additional set of registers can be used for specific situations such as high volume, high brightness announcement if a serious emergency is occurring versus lower volume and brightness settings for duty free opportunities. The emergency settings would be intended to wake someone up from a sleep if possible. Once the PA key signal is no longer active 608, at least a portion of the original passenger's settings are restored to the same state as before the announcement 610.

What has been described above includes examples of the embodiments. It is, of course, not possible to describe every conceivable combination of components or methodologies for purposes of describing the embodiments, but one of ordinary skill in the art can recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system, comprising:
a controller for a receiver that is responsive to a command, wherein the controller saves a first set of settings in response to a command, loads a second set of settings associated with the command after saving the first set of settings, accepts setting changes to the second set of settings and reloads unchanged settings from the first set of settings when the command is no longer valid.

2. The system of claim 1, wherein the controller receives an emergency control settings command and loads emergency control settings that help to immediately bring emergent conditions to the attention of viewers.

3. The system of claim 1, wherein the controller receives a service announcement control settings command and loads service announcement control settings.

4. The system of claim 1, wherein the controller receives a control settings command from an airborne multimedia content distribution system master controller.

5. The system of claim 1, wherein the controller loads portions of multiple sets of control settings associated with the control settings command into the content controller device after saving the first set of control settings.

6. A method, comprising:
receiving a command;
saving a first set of settings of a controller for a receiver in response to the command;
loading a second set of settings associated with the command into the controller after saving the first set of settings;
receiving setting changes to the second set of settings from a user; and
reloading unchanged settings from the first set of settings into the controller when the command is no longer valid.

7. The method of claim 6 further comprising:
receiving an emergency command that prompts loading of emergency settings that bring emergent conditions to the attention of viewers.

8. The method of claim 6 further comprising:
receiving a service command that prompts loading of service announcement control settings.

9. The method of claim 6 further comprising:
receiving a command from a master controller.

10. The method of claim 6 further comprising:
loading portions of multiple sets of settings associated with the command into the controller after saving the first set of settings.

11. A system, comprising:
a means for receiving a command;
a means for saving a first set of settings in response to the command;

a means for loading a second set of settings associated with the command after saving the first set of control settings;

receiving setting changes to the second set of settings from a user; and a means for reloading unchanged settings from the first set of settings when the command is no longer valid.

\* \* \* \* \*

UNITED STATES PATENT AND TRADEMARK OFFICE
CERTIFICATE OF CORRECTION

PATENT NO. : 8,447,162 B2
APPLICATION NO. : 12/735909
DATED : May 21, 2013
INVENTOR(S) : Mark Alan Schultz and Ronald Douglas Johnson It is certified that error appears in the above-identified patent and that said Letters Patent is hereby corrected as shown below:

Column 6, line 64, Claim 11 should read as follows after adding "a means for" in front of "receiving setting changes":

11. A system, comprising:
a means for receiving a command;
a means for saving a first set of settings in response to the command;
a means for loading a second set of settings associated with the command after saving the first set of control settings;
a means for receiving setting changes to the second set of settings from a user; and
a means for reloading unchanged settings from the first set of settings when the command is no longer valid.

Signed and Sealed this
Fifth Day of November, 2013

Teresa Stanek Rea
*Deputy Director of the United States Patent and Trademark Office*